(12) United States Patent
Kim et al.

(10) Patent No.: US 11,407,013 B2
(45) Date of Patent: Aug. 9, 2022

(54) APPARATUS AND METHOD FOR CLEANING LIDAR SENSOR

(71) Applicant: HYUNDAI MOBIS Co., Ltd., Seoul (KR)

(72) Inventors: Won Gyum Kim, Yongin-si (KR); Young Shin Kim, Yongin-si (KR); Kyung Rin Kim, Yongin-si (KR); Sung Eun Jo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 9 days.

(21) Appl. No.: 16/359,899

(22) Filed: Mar. 20, 2019

(65) Prior Publication Data

US 2019/0351464 A1 Nov. 21, 2019

(30) Foreign Application Priority Data

May 15, 2018 (KR) .......................... 10-2018-0055645

(51) Int. Cl.
| | |
|---|---|
| *B08B 3/02* | (2006.01) |
| *B08B 7/04* | (2006.01) |
| *G01S 7/497* | (2006.01) |
| *B08B 1/00* | (2006.01) |
| *B08B 5/02* | (2006.01) |
| *B08B 3/10* | (2006.01) |

(52) U.S. Cl.
CPC ................ *B08B 7/04* (2013.01); *B08B 1/005* (2013.01); *B08B 3/02* (2013.01); *B08B 3/10* (2013.01); *B08B 5/02* (2013.01); *G01S 7/497* (2013.01); *G01S 2007/4977* (2013.01)

(58) Field of Classification Search
CPC combination set(s) only.
See application file for complete search history.

(56) References Cited

U.S. PATENT DOCUMENTS

| | | | |
|---|---|---|---|
| 10,509,112 B1* | 12/2019 | Pan | G01S 7/4818 |
| 2008/0210881 A1* | 9/2008 | Harris | G01S 17/95 |
| | | | 250/393 |
| 2011/0073142 A1* | 3/2011 | Hattori | B60S 1/56 |
| | | | 134/56 R |
| 2011/0249120 A1* | 10/2011 | Bingle | H04N 5/2252 |
| | | | 348/148 |

(Continued)

FOREIGN PATENT DOCUMENTS

| | | |
|---|---|---|
| EP | 1304583 | 4/2003 |
| EP | 3287810 | 2/2018 |
| KR | 10-2015-0035204 | 4/2015 |

OTHER PUBLICATIONS

Korean Office Action dated Oct. 26, 2021, issued to Korean Patent Application No. 10-2018-0055645.

*Primary Examiner* — Erin F Bergner

(74) *Attorney, Agent, or Firm* — H.C. Park & Associates, PLC

(57) ABSTRACT

An apparatus for cleaning a lidar sensor may include: a contaminant detector configured to detect a contaminant adhering to a window cover of the lidar sensor; a rotator configured to rotate the window cover; a cleaner configured to clean the window cover; and a controller configured to control the rotator to rotate the window cover to a cleaning region for removing the contaminant, and control the cleaner to remove the contaminant, when the contaminant is detected by the contaminant detector.

7 Claims, 6 Drawing Sheets

(56) References Cited

U.S. PATENT DOCUMENTS

| | | | |
|---|---|---|---|
| 2013/0219742 A1* | 8/2013 | Field | G02B 27/0006 34/565 |
| 2015/0090291 A1 | 4/2015 | Na et al. | |
| 2018/0015908 A1* | 1/2018 | Rice | G05D 1/0088 |
| 2018/0265048 A1* | 9/2018 | Schmidt | B08B 1/002 |
| 2019/0106085 A1* | 4/2019 | Bacchus | B60S 1/56 |

\* cited by examiner

Contaminant

APPARATUS AND METHOD FOR CLEANING LIDAR SENSOR

CROSS-REFERENCES TO RELATED APPLICATIONS

The present application claims priority from the benefit of Korean application number 10-2018-0055645, filed on May 15, 2018, which is hereby incorporated by reference for all purposes as if fully set forth herein.

BACKGROUND

Field

The present invention relates to an apparatus and method for cleaning a lidar (light detection and ranging) sensor, and more particularly, to an apparatus and method for cleaning a lidar sensor, which can remove contaminants adhering to a window cover of a lidar sensor.

Discussion of the Background

The above information disclosed in the Background section is only for understanding of the background of the inventive concepts, and, therefore, it may contain information that does not constitute prior art.

The autonomous driving level 3 requires functions such as highway autonomous driving and autonomous parking. Thus, the need for a lidar sensor with high distance resolution is increasing. Such a lidar sensor senses an object or structure by sensing areas at the front and rear of the vehicle.

In general, the lidar sensor is mounted on the front bumper, and exposed to the outside. When the lidar sensor is installed in another structure such as a vehicle body or glass, the sensing performance of the lidar sensor may be significantly degraded. Thus, the lidar sensor needs to be exposed to the outside when installed.

Typically, the lidar sensor includes a laser transmitter, a laser receiver and a driver, and separately includes a cover for protecting the sensor from external foreign matters.

Since the lidar sensor senses a distance through a process of transmitting/receiving light, the lidar sensor is very sensitive to contamination of the cover. Therefore, it is necessary to prevent contamination of the lidar sensor, in order to maintain the performance of the lidar sensor. Conventionally, however, much research has not been conducted on a method for cleaning a lidar sensor.

The related art of the present invention is disclosed in Korean Patent Publication No. 10-2015-0035204 published on Apr. 6, 2015 and entitled "Apparatus and method for removing contamination of distance measuring sensor for vehicle".

SUMMARY

Embodiments of the present invention are directed to an apparatus and method for cleaning a lidar sensor, which can remove contaminants adhering to a window cover while rotating the window cover, when the contaminants are detected.

Also, embodiments of the present invention are directed to an apparatus and method for cleaning a lidar sensor, which can operate a lidar sensor even while a window cover is cleaned, thereby improving the operation time of the lidar sensor and preventing a reduction in performance of the lidar sensor.

In one embodiment, an apparatus for cleaning a lidar sensor may include: a contaminant detector configured to detect a contaminant adhering to a window cover of the lidar sensor; a rotator configured to rotate the window cover; a cleaner configured to clean the window cover; and a controller configured to control the rotator to rotate the window cover to a cleaning region for removing the contaminant, and control the cleaner to remove the contaminant, when the contaminant is detected by the contaminant detector.

When the contaminant is detected by the contaminant detector, the controller may control the rotator to rotate the window cover, regardless of whether the lidar sensor is operated.

The rotator may include: a rotating plate rotatably supporting the window cover; and a rotating motor configured to rotate the rotating plate according to a control signal of the controller.

The apparatus may further include a case which seals the cleaning region to block contaminants from being introduced into the cleaning region from outside.

The contaminant detector may detect the contaminant by analyzing the signal intensity or characteristic of a signal inputted from a laser receiver of the lidar sensor.

The cleaner may include one or more of a liquid sprayer configured to spray a wash solution onto the window cover, an air sprayer configured to spray air onto the window cover, a heating dryer configured to dry the window cover by heating the window cover, and a wiper driver configured to drive a wiper to remove moisture on the window cover.

When the contaminant is detected by the contaminant detector, the controller may control the rotator to rotate the window cover by a preset angle.

In another embodiment, a method for cleaning a lidar sensor may include: detecting, by a contaminant detector, a contaminant adhering to a window cover of the lidar sensor; controlling, by the controller, a rotator to rotate the window cover to a cleaning region for removing the contaminant, when the contaminant is detected; and controlling, by the controller, a cleaner to clean the window cover.

When the contaminant is detected by the contaminant detector, the controller may control the rotator to rotate the window cover, regardless of whether the lidar sensor is operated.

The rotator may include: a rotating plate rotatably supporting the window cover; and a rotating motor configured to rotate the rotating plate according to a control signal of the controller.

The contaminant detector may detect the contaminant by analyzing the signal intensity or characteristic of a signal inputted from a laser receiver of the lidar sensor.

The cleaner may include one or more of a liquid sprayer configured to spray a wash solution onto the window cover, an air sprayer configured to spray air onto the window cover, a heating dryer configured to dry the window cover by heating the window cover, and a wiper driver configured to drive a wiper to remove moisture on the window cover.

When the contaminant is detected by the contaminant detector, the controller may control the rotator to rotate the window cover by a preset angle.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
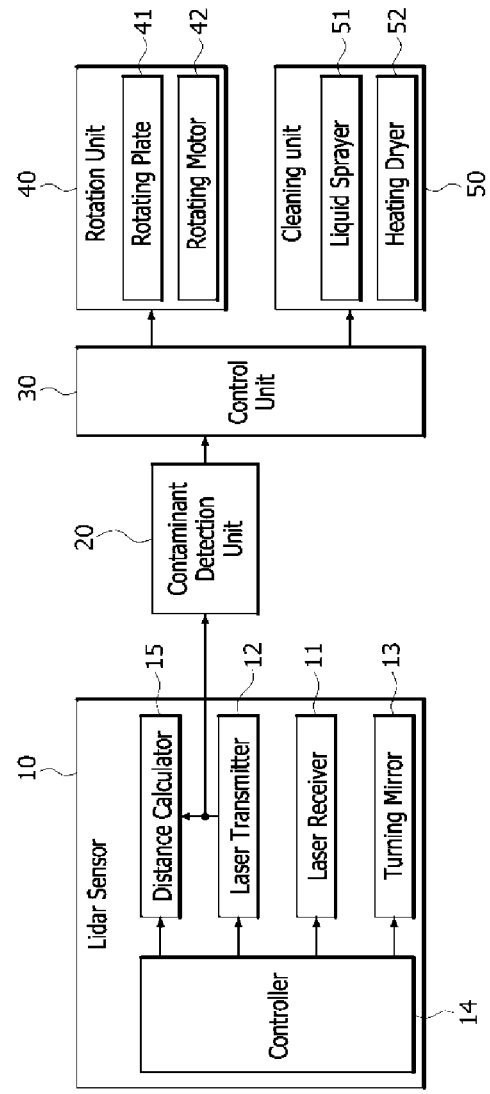
FIG. 1 is a block diagram illustrating an apparatus for cleaning a lidar sensor in accordance with an embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereafter, an apparatus and method for cleaning a lidar sensor in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 2:
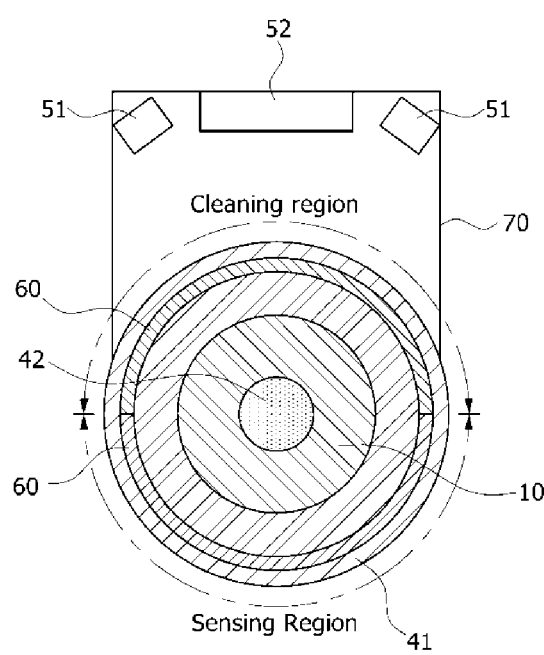
FIG. 2 is a plan view of the apparatus for cleaning a lidar sensor in accordance with the embodiment of the present invention.
Figure 3:
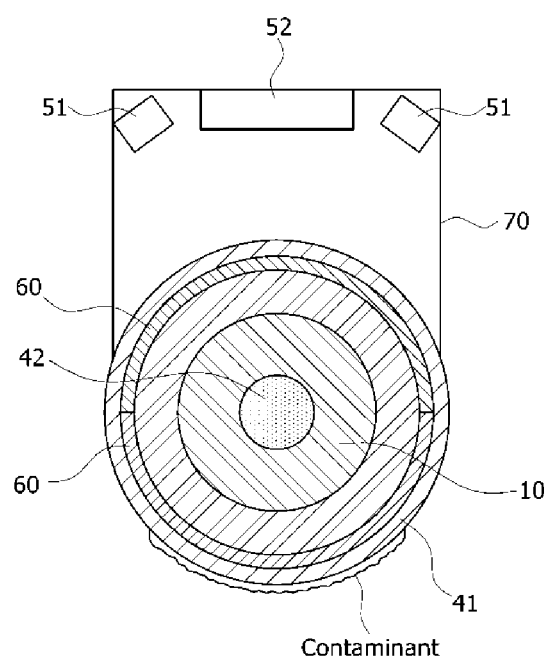
FIG. 3 illustrates that a window cover in accordance with the embodiment of the present invention is contaminated.
Figure 4:
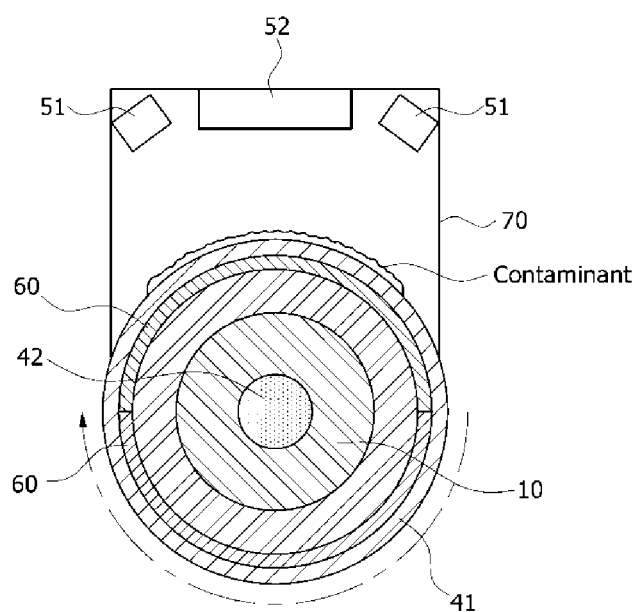
FIG. 4 illustrates that the window cover in accordance with the embodiment of the present invention is rotated.
Figure 5:
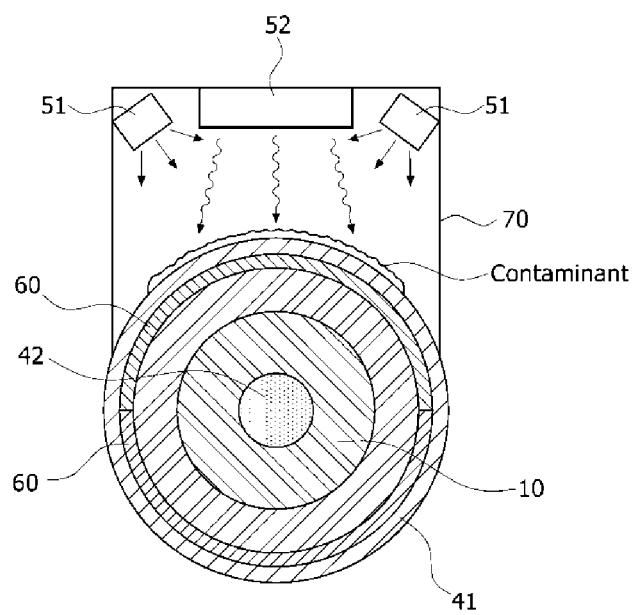
FIG. 5 illustrates that the window cover in accordance with the embodiment of the present invention is cleaned.

FIG. 1 is a block diagram illustrating an apparatus for cleaning a lidar sensor in accordance with an embodiment of the present invention, FIG. 2 is a plan view of the apparatus for cleaning a lidar sensor in accordance with the embodiment of the present invention, FIG. 3 illustrates that a window cover in accordance with the embodiment of the present invention is contaminated, FIG. 4 illustrates that the window cover in accordance with the embodiment of the present invention is rotated, and FIG. 5 illustrates that the window cover in accordance with the embodiment of the present invention is cleaned.

Referring to FIGS. 1 to 5, the apparatus for cleaning a lidar sensor in accordance with the embodiment of the present invention may include a contaminant detection unit 20, a control unit 30, a rotation unit 40, a cleaning unit 50 and a case 70.

The contaminant detection unit 20 may analyze a signal inputted from a laser receiver 12 of a lidar sensor 10, and detect contaminants adhering to a window cover 60 according to the signal characteristic.

The lidar sensor 10 may include a laser transmitter 11, a laser receiver 12, a turning mirror 13, a controller 14 and a distance calculator 15.

The laser transmitter 11 may emit light in a preset wavelength band in order to measure a distance from a target outside. The wavelength band of the light emitted from the laser transmitter 11 may not be specifically limited.

The laser receiver 12 may receive light which is emitted from the laser transmitter 11 and reflected from the target, convert the received light into an electrical signal, and then input the electrical signal to the distance calculator 15.

The turning mirror 13 may be installed on an optical path on which light is transmitted/received by the laser transmitter 11 or the laser receiver 12, and turned to reflect the transmitted/received light.

The controller 14 may control the laser transmitter 11 to emit light to the target, control the laser receiver 12 to receive light reflected from the target, and control the turning mirror 13 to adjust the optical path.

The distance calculator 15 may calculate the distance from the target using a signal outputted from the laser receiver 12, i.e. a pulse signal.

For reference, FIG. 1 schematically illustrates the main parts of the lidar sensor 10, and the components and operations of the lidar sensor 10 may not be limited to the above-described embodiment, but added or changed in various manners.

The contaminant detection unit 20 may analyze the signal intensity or signal characteristic of the signal inputted from the laser receiver 12 of the lidar sensor 10, and detect the contaminants adhering to the window cover 60.

That is, the contaminant detection unit 20 may determine that contaminants adhere to the window cover 60, when the signal intensity of the corresponding signal is relatively low.

Besides, the contaminant detection unit 20 may detect the contaminants adhering to the window cover 60 by analyzing the signal characteristic of the signal inputted to the distance calculator 15 from the laser receiver 12 of the lidar sensor 10. The signal characteristic may include any one of a signal magnitude, a detection pattern, a detection region, information on whether contaminants move, and information on whether an echo signal is received.

The signal characteristics such as the signal magnitude, the detection pattern, the detection region, the information on whether contaminants move, and the information on whether the echo signal is received may vary depending on the contaminants. According to the signal characteristics, the contaminant detection unit 20 may detect the contaminants adhering to the window cover 60.

The rotation unit 40 may rotate the window cover 60 in response to a control signal of the control unit 30, and include a rotating plate 41 and a rotating motor 42.

The rotating plate 41 may rotatably support the window cover 60. In an embodiment, the window cover 60 may be installed so as to be rotated by 360 or 180 degrees.

Referring to FIG. 2, the rotating plate 41 may be installed at the bottom of the window cover 60, support the window cover 60, and rotate the window cover 60 while rotated by the rotating motor 42.

The rotating plate 41 may be formed in a circular shape according to the shape and structure of the window cover 60. However, the rotating plate 41 may not be limited thereto, but formed in various shapes.

The rotating motor 42 may rotate the rotating plate 41. The rotating motor 42 may rotate the rotating plate 41 in the clockwise or counterclockwise direction, and rotate the rotating plate 41 by a preset angle.

The preset angle may indicate an angle by which the window cover 60 is rotated when the window cover 60 is rotated once. The preset angle may be set to various angles depending on a sensing region or cleaning region.

The sensing region is where the window cover 60 of the lidar sensor is positioned in order to detect a distance from the target, and the cleaning region is where contaminants adhering to the window cover 60 are removed.

When a contaminant adheres to the window cover 60 as illustrated in FIG. 3 while the distance from the target is sensed through the window cover 60 of the sensing region, the contaminant adhering to the window cover 60 may be detected through the contaminant detection unit 20. At this time, as illustrated in FIG. 4, the rotation unit 40 may rotate the window cover 60 by the preset angle according to a control signal of the control unit 30.

Therefore, the window cover 60 of the sensing region may be positioned at the cleaning region such that the contaminant is positioned at the cleaning region. Furthermore, the window cover 60 of the cleaning region may be positioned at the sensing region.

The cleaning unit 50 may be installed in the case 70 so as to clean the window cover 60. The cleaning unit 50 may include a liquid sprayer 51 for spraying a wash solution onto the window cover 60 and a heating dryer 52 for drying the window cover 60 by heating the window cover 60. In addition, the cleaning unit 50 may further include an air sprayer for removing contaminants or moisture on the window cover 60 by spraying air onto the window cover 60 and a wiper driver for driving a wiper to remove moisture on the window cover 60.

In the present embodiment, FIG. 5 illustrates that the cleaning unit 50 includes the liquid sprayer 51 and the heating dryer 52.

That is, when the liquid sprayer 51 removes the contaminants adhering to the window cover 60 by spraying a wash solution onto the window cover 60, the heating dryer 52 may remove moisture remaining on the window cover 60 by heating the window cover 60.

The case 70 may seal the cleaning region such that contaminants from outside are not introduced into the case 70 or the wash solution in the case 70 is not discharged to the outside. As such, the case 70 may seal the cleaning region, such that the inside of the case 70 can be maintained clean. As a result, the window cover 60 cleaned in the cleaning region can be maintained clean at all times. When the window cover 60 of the sensing region is contaminated and rotated, the window cover 60 which had been in the cleaning region may be rotated and positioned at the sensing region. Therefore, the lidar sensor can sense a distance from the target through the clean window cover 60.

That is, when a contaminant adhering to the window cover 60 is detected while the distance from the target is sensed through the window cover 60 positioned at the sensing region, the window cover 60 may be rotated by the rotation unit 40 and positioned at the cleaning region. At this time, the window cover 60 may be cleaned by the cleaning unit 50. When the window cover 60 is completely cleaned by the cleaning unit 50, the window cover 60 may be maintained clean by the case 70.

Then, when the window cover 60 of the sensing region is contaminated and rotated by the rotation unit 40, the window cover 60 of the sensing region may be positioned at the cleaning region and then cleaned by the cleaning unit 50, while the window cover 60 of the cleaning region is positioned at the sensing region. In this case, the lidar sensor can sense the distance from the target through the clean window cover 60.

As described above, although a contaminant of the window cover 60 is detected, the operation of the lidar sensor may not be stopped even while the window cover 60 is cleaned. Therefore, the operation time of the lidar sensor can be improved while the performance thereof is maintained.

That is, the window cover 60 can be cleaned even while the lidar sensor is operated, regardless of whether the lidar sensor is operated.

When a contaminant adheres to the window cover 60 and is detected by the contaminant detection unit 20 while the lidar sensor is operated, the control unit 30 may control the rotation unit 40 to rotate the window cover 60 by the preset angle, depending on the contaminant detected through the contaminant detection unit 20.

Therefore, the window cover 60 of the sensing region may be positioned at the cleaning region, and the window cover 60 of the cleaning region may be positioned at the sensing region.

As the window cover 60 of the sensing region is positioned at the sensing region, the control unit 30 may control the cleaning unit 50 to clean the window cover 60.

Furthermore, as the window cover 60 which had been in the cleaning region is positioned at the sensing region, the lidar sensor may sense a distance from the target through the clean window cover 60. That is, even while the window cover 60 is cleaned by the cleaning unit 50, the lidar sensor can be operated. Therefore, the operation time of the lidar sensor can be improved while a reduction in performance of the lidar sensor is prevented.

Hereafter, a method for cleaning a lidar sensor in accordance with an embodiment of the present invention will be described in detail with reference to FIG. 6.

Figure 6:
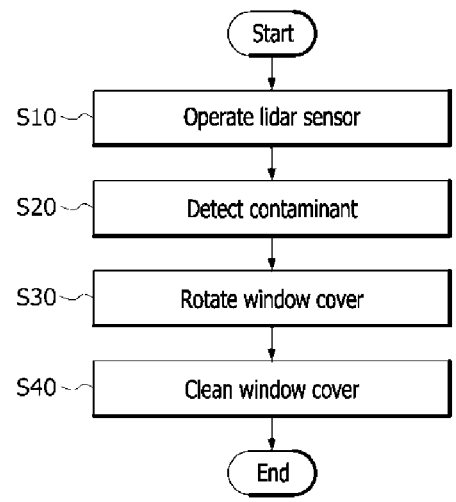
FIG. 6 is a flowchart illustrating a method for cleaning a lidar sensor in accordance with an embodiment of the present invention.

FIG. 6 is a flowchart illustrating a method for cleaning a lidar sensor in accordance with an embodiment of the present invention.

Referring to FIG. 6, the lidar sensor may be operated to detect a distance from a target, at step S10. That is, in order to measure the distance from the target outside, the controller 14 may emit light through the laser transmitter 11, receive the light which is emitted from the laser transmitter 11 and reflected from the target, through the laser receiver 12, and convert the received light into an electrical signal. Such an electrical signal may be inputted to the distance calculator 15. At this time, the turning mirror 13 may be turned to reflect the transmitted or received light according to a control signal of the controller 14. The distance calculator 15 may calculate the distance from the target using the electrical signal outputted from the laser receiver 12, i.e. a pulse signal.

During this process, the contaminant detection unit 20 may detect a contaminant adhering to the window cover 60, based on the signal intensity or characteristic of the signal outputted from the laser receiver, at step S20.

When the contaminant adhering to the window cover 60 is detected by the contaminant detection unit 20, the control unit 30 may control the rotation unit 40 to rotate the window cover 60 by the preset angle, depending on the contaminant detected through the contaminant detection unit 20, at step S30.

When the control unit 30 rotates the window cover 60 through the rotation unit 40, the window cover 60 of the sensing region may be positioned at the cleaning region, and the window cover 60 of the cleaning region may be positioned at the sensing region.

Then, the control unit 30 may control the cleaning unit 50 to clean the window cover 60 at step S40. For example, the control unit 30 may remove the contaminant adhering to the window cover 60 by spraying a wash solution onto the window cover 60 through the liquid sprayer 51, and remove moisture on the window cover 60 by heating the window cover 60 through the heating dryer 52.

At this time, since the cleaning region is sealed by the case 70, the window cover 60 of the cleaning region may be maintained clean.

As the window cover 60 which had been in the cleaning region is positioned at the sensing region, the lidar sensor may sense the distance from the target through the clean window cover 60. That is, even while the window cover 60 is cleaned by the cleaning unit 50, the lidar sensor can be operated.

When a contaminant adhering to the window cover is detected, the apparatus for cleaning a lidar sensor in accordance with the embodiment of the present invention can remove the contaminant while rotating the window cover.

Furthermore, the lidar sensor can be operated while the apparatus cleans the window cover. Therefore, the operation time of the lidar sensor can be improved while a reduction in performance of the lidar sensor is prevented.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A lidar sensor, comprising:
   a contaminant detector to detect contaminant adhering to a window cover of the lidar sensor;
   a rotator to rotate the window cover;
   a cleaner to clean the window cover; and
   a controller to control the rotator to rotate the window cover to a cleaning region, and to control the cleaner to remove the contaminant, when the contaminant is detected by the contaminant detector,
   wherein the cleaner comprises each of: a liquid sprayer to spray a wash solution onto the window cover, a first air sprayer to spray air onto the window cover, a second air sprayer to spray air onto the window cover from a different angle than the first air sprayer, a heating dryer to dry the window cover by heating the window cover, and a wiper driver to drive a wiper to remove moisture from the window cover,
   wherein the heating dryer is positioned between the first and second air sprayers, to thereby heat air sprayed onto the window cover by both the first and second air sprayers.

2. A method for cleaning a lidar sensor, comprising:
   detecting contaminant adhering to a window cover of the lidar sensor by determining that an echo signal is received from lidar sensor;
   moving a part of the window cover that has contaminant to a cleaning region; and
   cleaning the window cover,
   wherein the cleaning is performed by a cleaner comprising each of a liquid sprayer to spray a wash solution onto the window cover, a first air sprayer to spray air onto the window cover, a second air sprayer to spray air onto the window cover from a different angle than the first air sprayer, a heating dryer to dry the window cover by heating the window cover, and a wiper driver to drive a wiper to remove moisture on the window cover,
   wherein the heating dryer is positioned between the first and second air sprayers, to thereby heat air sprayed onto the window cover by both the first and second air sprayers.

3. The method of claim 2, wherein when the contaminant is detected by a contaminant detector, and a controller controls the motion of the window cover, regardless of whether the lidar sensor is operated.

4. The method of claim 3, wherein the part of the window cover is moved by a rotator comprising:
   a rotating plate rotatably supporting the window cover; and
   a rotating motor to rotate the rotating plate according to a control signal of the controller.

5. The method of claim 3, wherein when the contaminant is detected by the contaminant detector, the controller controls the rotator to rotate the window cover by a preset angle.

6. The lidar sensor of claim 1, wherein the cleaning region includes a first boundary defining a first end of the cleaning region and a second boundary defining a second end of the cleaning region,
   wherein the first air sprayer is disposed adjacent to the first boundary, the second air sprayer is disposed adjacent to the second boundary, and the heating dryer is disposed in a middle portion of the cleaning region between the first and second boundaries.

7. The lidar sensor of claim 6, wherein the cleaning region is separate from a sensing region within which the lidar sensor senses signals received from objects, and
   wherein the first air sprayer sprays air onto a first portion of the cleaning region separate from a second portion of the cleaning region onto which the second air sprayer sprays air.

* * * * *